Patented Aug. 29, 1933

1,924,145

UNITED STATES PATENT OFFICE 1,924,145

PROCESS FOR MANUFACTURING OXYGEN EVOLVING PREPARATIONS

Walter Zisch, Frankfort-on-the-Main, Germany

No Drawing. Application December 23, 1930, Serial No. 504,417, and in Germany December 30, 1929

9 Claims. (Cl. 23—6)

My invention relates to preparing oxygen evolving preparations suitable for use in respiratory apparatus or for the purification of air and refers in particular to the use of lower hydrates of peroxides of the alkali metals.

According to a known process lower hydrates which are suitable for the above mentioned purpose and which have probably the composition of a hydrate with two molecules of water are prepared by mixing intimately ground anhydrous peroxides of alkali metals with finely divided substances containing water of crystallization in suitable proportions. On heating such a mixture the reaction spontaneously proceeds throughout the whole mass whereby the water of the added substance containing water of crystallization is distributed over the whole mass and the lower hydrate is formed. By this process porous products are obtained which are applied in the shape of suitably shaped bodies or pieces.

It is, further, known that the most efficacious preparations evolving oxygen in respiratory apparatus or for purification of breathing air are produced by incorporating about one-third to one molecule of water, preferably about one-half molecule into one molecule of alkali metal peroxide, for instance, sodium peroxide.

According to my present invention products which are particularly adapted for the use in respiratory apparatus are prepared by subjecting the peroxide to be hydrated after the water has been added, for instance, by admixing substances containing water of crystallization, during or after the heating to a high pressure. By the same process the mass as the case may be can be given a suitable shape. The pressure to which I subject my products in order to obtain the products aimed at must exceed 100 kgrs. per square centimeter and advantageously ranges between, for instance, 350 and 400 kgrs./cm$^2$.

In carrying out my invention I can, for instance, add to finely ground dry sodium peroxide, for instance, in the manner described in the above mentioned known process, finely divided substances containing water of crystallization I then heat the mixture and after the reaction has taken place I reduce the porous mass obtained to the desired size preferably to grains or granules of about 1 mm. and less, remove any powderous constituents by sieving and, subsequently, subject the grains to a pressure of, for example, 350 to 400 kilograms per cm$^2$. The sieving wastes may with advantage be utilized by re-introducing them into the manufacturing process. This is done, for instance, by mixing them with suitable quantities of the granulated mass and shaping the mixture. I am thus enabled to influence the shaped bodies as regards their porosity. In certain cases I can also proceed by not sieving off the powder, but shaping the comminuted mass directly. Finally the sieving waste may be briquetted alone.

The mixture of, for instance, sodium peroxide, and salts containing water of crystallization may, also, be subjected directly to a pressure of the said nature and then the briquetted pieces thus obtained be heated to the temperature required. In this case a lower pressure such as for instance 150 to 200 kgrs./cm.$^2$ are sufficient, in general, to obtain the desired result.

For simplifying the process of manufacturing the preparations, for instance, briquets or shaped bodies of a greater size may be produced in the first instance which are then reduced in suitable devices, such as, for instance, breakers, frazers, mills or the like to the sizes most suitable for the application. The sieving waste may be utilized again, for instance, by admixing it in suitable proportions to the product to be briquetted and subjecting the mixing to a pressure of suitable size. The sieving waste is preferably utilized by adding it to the mixture of, for instance, sodium peroxide and salts containing water of crystallization shaping said mixture and subsequently heating it.

The said bodies may be heated by maintaining them for a certain time which may last for several hours to temperatures of about 120° centigrade. The most suitable temperature and duration of heating is advantageously found out beforehand by experiment.

Preparations which are made according to my invention have certain advantages over those obtained by the previously known processes. The latter have, for instance, the disadvantage that on using the breathing apparatus after the evolution of oxygen has started the oxygen is generated too rapidly and in too great a quantity whereby results amongst other disadvantages too rapid an exhaustion of the contents of the respiratory apparatus. In comparison with these products the products of my invention offer the advantages that on the one hand the evolution of the oxygen starts very quickly after the apparatus is taken into use, on the other hand after the evolution has commenced the oxygen is given off slowly and quietly and in correspondence with the requirements of the carrier of the apparatus. Thus losses at the beginning are avoided and the efficiency and the life of the apparatus i. e. the cartridge filled with the oxygen evolving preparations is prolonged and improved. A further advantage of these products is that they have a greater mechanical strength and stability. They can, therefore, resist much better any pressing or rubbing action to which the masses are necessarily subjected in the respiratory apparatus during their application than products which have not been treated in the said manner. Whilst with the products of the latter kind which have not been subjected to the high pressure according to my process always a certain amount of dust is formed in consequence of the apparatus being carried about and the dust causes clogging of the cartridges and further irritation of the respiratory organs of the carrier of the apparatus and other troubles, the products of the present invention are free from these disadvantages. A further advantage of my process is that losses of valuable material are avoided as the substance obtained during the manufacturing process in the form of powder can be introduced again in the process and thus be utilized.

I wish it to be understood that I do not restrict my process to the preparation of peroxide hydrates according to the process above mentioned where the water is introduced in the shape of water of crystallization with salts containing such water of crystallization. It can be applied with advantage, also, to hydrates of peroxide into which the water is introduced in any other suitable way, for instance, to hydrates which are obtained by hydrating peroxides of alkali metals by means of finely distributed water according to my co-pending application S. No. 336,630. The products of the present invention may be utilized with advantage after catalysts of the well known kind have been incorporated in the well known way. Preferably this may be done before the pressure according to my invention is applied.

From the foregoing description it will be seen that I may, in general, proceed in one of three ways: (1) I may take an alkali peroxide which is already properly hydrated and subject it to pressure to assure a shaped or briquetted body; (2) I may mix an alkali peroxide with a crystalline substance containing water of crystallization which has been heated and then subject the mass to pressure to obtain a briquetted or shaped body; (3) I may mix a crystalline body containing water of crystallization containing alkali peroxide, subject it to pressure, and then heat it.

The first two cases are virtually one in that the operation of my invention starts with a known product, that is, a hydrated alkali peroxide. The third method is a process in which the interchange between the hydrating body and the alkali peroxide is not accomplished until after the application of pressure.

What I claim is:

1. In the process for manufacturing porous substantially dust free oxygen evolving preparations suitable for use in breathing apparatus in which oxygen is evolved by the contact of $CO_2$ from the breath with the preparation the step which consists in forming bodies capable of withstanding rough usage by subjecting the hydrated peroxides of alkali metals to high pressure.

2. In the process for manufacturing porous substantially dust free oxygen evolving preparations suitable for use in breathing apparatus in which oxygen is evolved by the contact of $CO_2$ from the breath with the preparation the step which consists in forming bodies capable of withstanding rough usage by subjecting the hydrated peroxides of alkali metals to a pressure exceeding 100 kilograms per square centimeter.

3. In the process for manufacturing porous substantially dust free oxygen evolving preparations suitable for use in breathing apparatus in which oxygen is evolved by the contact of $CO_2$ from the breath with the preparation the step which consists in forming bodies capable of withstanding rough usage by subjecting the hydrated peroxides of alkali metals to pressures ranging from 350 to 400 kilograms per $cm^2$.

4. In the process for manufacturing porous substantially dust free oxygen evolving preparations suitable for use in breathing apparatus in which oxygen is evolved by the contact of $CO_2$ from the breath with the preparation the step which consists in forming bodies capable of withstanding rough usage by subjecting the alkali metal peroxides mixed with a substance containing water of crystallization to high pressures and heating the shaped bodies.

5. In the process for manufacturing porous substantially dust free oxygen evolving preparations suitable for use in breathing apparatus in which oxygen is evolved by the contact of $CO_2$ from the breath with the preparation the step which consists in forming bodies capable of withstanding rough usage by subjecting the alkali metal peroxides hydrated by the introduction of one-third to one molecule of water to each molecule of alkali metal peroxide to high pressure.

6. In the process for manufacturing porous substantially dust free oxygen evolving preparations suitable for use in breathing apparatus in which oxygen is evolved by the contact of $CO_2$ from the breath with the preparation the step which consists in forming bodies capable of withstanding rough usage by subjecting the alkali metal peroxides hydrated by the introduction of one-half molecule of water to each molecule of alkali metal peroxide to high pressure.

7. In the process for manufacturing porous substantially dust free oxygen evolving preparations suitable for use in breathing apparatus in which oxygen is evolved by the contact of $CO_2$ from the breath with the preparation the step which consists in forming bodies capable of withstanding rough usage by subjecting the hydrated alkali metal peroxides to high pressures reducing the shaped bodies obtained to suitably sized grains, removing the pulverulent sieving waste and utilizing the latter by admixing it to fresh hydrated peroxides not yet subjected to the pressure process.

8. In the process for manufacturing porous substantially dust free oxygen evolving preparations suitable for use in breathing apparatus in which oxygen is evolved by the contact of $CO_2$ from the breath with the preparation the step which consists in forming bodies capable of withstanding rough usage by subjecting the hydrated alkali metal peroxides to high pressures reducing the shaped bodies obtained to suitably sized grains, removing the pulverulent sieving waste and utilizing the latter by admixing same in desired quantities to masses to be subjected to application of high pressures.

9. In the process for manufacturing porous substantially dust free oxygen evolving preparations suitable for use in breathing apparatus wherein oxygen is evolved by contact of $CO_2$ of the breath with the preparation the step which consists in forming bodies capable of withstanding rough usage by subjecting the hydrated alkali metal peroxides to high pressure reducing the shaped bodies obtained to suitably sized grains and then removing finer particles by sifting.

WALTER ZISCH.